United States Patent
Wang et al.

(10) Patent No.: US 10,713,804 B2
(45) Date of Patent: Jul. 14, 2020

(54) METHOD FOR OBTAINING COMBINED DEPTH IMAGE, AND DEPTH CAMERA

(71) Applicant: Hangzhou Hikvision Digital Technology Co., Ltd., Hangzhou, Zhejiang (CN)

(72) Inventors: Jingxiong Wang, Zhejiang (CN); Hui Mao, Zhejiang (CN); Linjie Shen, Zhejiang (CN); Hai Yu, Zhejiang (CN); Shiliang Pu, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 77 days.

(21) Appl. No.: 15/767,607

(22) PCT Filed: Aug. 5, 2016

(86) PCT No.: PCT/CN2016/093546
§ 371 (c)(1),
(2) Date: Apr. 11, 2018

(87) PCT Pub. No.: WO2017/063435
PCT Pub. Date: Apr. 20, 2017

(65) Prior Publication Data
US 2018/0300891 A1    Oct. 18, 2018

(30) Foreign Application Priority Data

Oct. 15, 2015    (CN) .......................... 2015 1 0665910

(51) Int. Cl.
*G06T 7/521*    (2017.01)
*G06T 7/55*    (2017.01)
(Continued)

(52) U.S. Cl.
CPC .............. *G06T 7/521* (2017.01); *G01S 17/87* (2013.01); *G01S 17/89* (2013.01); *G06T 7/55* (2017.01);
(Continued)

(58) Field of Classification Search
None
See application file for complete search history.

(56) References Cited

U.S. PATENT DOCUMENTS

| 2003/0076484 A1 | 4/2003 | Bamji et al. |
| 2013/0222656 A1* | 8/2013 | Kaneko .................. H04N 5/247 348/262 |

(Continued)

FOREIGN PATENT DOCUMENTS

| CN | 101866056 | 10/2010 |
| CN | 102741651 | 10/2012 |

(Continued)

*Primary Examiner* — Edemio Navas, Jr.
(74) *Attorney, Agent, or Firm* — Michael J. Blessent; Bret E. Field; Bozicevic, Field & Francis LLP

(57) ABSTRACT

A method for obtaining a combined depth map, and a depth camera. The method is applicable to a processor in the depth camera. The depth camera includes the processor, at least one light emitting element, and at least two time-of-flight (ToF) sensors, and the composite irradiation range of the at least one light emitting element convers the composite field of view of the at least two ToF sensors. The light emitting elements in the depth camera modulate light signals with the same modulation signal and then transmit the modulated light signals; the ToF sensors demodulate, by using same demodulation signal corresponding to the modulation signal, the received modulated light signal reflected back by an object, so as to generate depth data; and the processor performs data fusion processing on all the received depth data, so as to obtain a combined depth map. By applying the technical solutions provided in the embodiments of the (Continued)

present application, the application requirements of the depth map of the large field of view can be satisfied, and the problem of mutual interference due to asynchronization of modulation and demodulation can be avoided.

15 Claims, 6 Drawing Sheets

(51) Int. Cl.
  *H04N 5/225* (2006.01)
  *H04N 9/04* (2006.01)
  *G01S 17/87* (2020.01)
  *G01S 17/89* (2020.01)
(52) U.S. Cl.
  CPC ........... *H04N 5/225* (2013.01); *H04N 5/2256* (2013.01); *H04N 9/04* (2013.01); *G06T 2207/10024* (2013.01); *G06T 2207/10028* (2013.01); *G06T 2207/10152* (2013.01); *G06T 2207/20221* (2013.01)

(56) References Cited

U.S. PATENT DOCUMENTS

| | | | |
|---|---|---|---|
| 2014/0028804 A1* | 1/2014 | Usuda | G01S 17/023 348/47 |
| 2014/0071234 A1* | 3/2014 | Millett | G01S 17/89 348/43 |
| 2015/0163474 A1 | 6/2015 | You et al. | |
| 2016/0295193 A1* | 10/2016 | Van Nieuwenhove | H04N 13/122 |

FOREIGN PATENT DOCUMENTS

| | | |
|---|---|---|
| CN | 103026256 | 4/2013 |
| CN | 104838284 | 8/2015 |
| EP | 2890125 A1 | 7/2015 |

\* cited by examiner

METHOD FOR OBTAINING COMBINED DEPTH IMAGE, AND DEPTH CAMERA

The present application claims the priority to a Chinese patent application No. 201510665910.6 filed with the State Intellectual Property Office of the People's Republic of China on Oct. 15, 2015 and entitled "Method for obtaining combined depth image, and depth camera", which is incorporated herein by reference in its entirety.

TECHNICAL FIELD

The present application relates to the field of video monitoring technology, and in particular to a method for obtaining a combined depth map and a depth camera.

BACKGROUND

A depth camera has a certain resolution as an ordinary camera does. However, for each pixel of a depth camera, the distance from an object corresponding to the pixel to the camera is stored. Such a distance can be referred to as depth. As such, a depth camera outputs a depth map, and the value of each pixel on the depth map represents the distance from an object corresponding to this pixel to the camera.

A depth camera using a ToF (Time of Flight) sensor outputs a depth map through ToF technology, wherein ToF technology measures the distance between an object that reflects an optical signal and the transmitting and receiving ends by transmitting and receiving a modulated optical signal and analyzing the time difference between the transmitted and received optical signals. A ToF sensor is an element receiving and analyzing optical signals in the practical application of the ToF technology, which cooperates with an element emitting modulated optical signals to achieve depth measurement. Generally, a depth map can be obtained through some mathematical transformation of the output of the ToF sensor.

At present, a depth camera with a single ToF sensor is typically used in the industry. Generally, a depth camera with a single ToF sensor has a smaller field of view within which the depth can be measured, and thus may fail to meet the needs of some applications that require a depth map with a large field of view. In order to meet the needs of applications requiring a depth map with a large field of view, it is often necessary to use a plurality of single-ToF-sensor depth cameras in the same scene. In this case, however, there is a problem that the depth cameras interfere with each other due to asynchronization of modulation and demodulation.

SUMMARY

The purpose of the embodiments of the present application is to provide a method for obtaining a combined depth map and a depth camera, in order to solve the problem of mutual interference between a plurality of single-TOF-sensor depth cameras. The technical solutions are as follows:

In a first aspect, the present application provide a depth camera, including: a processor, at least one light emitting element, and at least two ToF sensors; a composite irradiation range of the at least one light emitting element covering a composite field of view of the at least two ToF sensors, wherein, the processor is configured to generate a modulation signal and a demodulation signal, output the modulation signal to each light emitting element, output the demodulation signal to each ToF sensor, receive depth data input by each ToF sensor, perform data fusion processing on all the received depth data to generate combined depth data, and obtain a combined depth map based on the combined depth data;

each light emitting element is configured to receive a modulation signal input by the processor, modulate its own light signal with the modulation signal, and transmit a modulated light signal to an object within its own irradiation range;

each ToF sensor is configured to receive a demodulation signal input by the processor, receive a modulated light signal reflected back by an object within its own field of view, demodulate the received light signal with the demodulation signal to generate depth data, and output the generated depth data to the processor.

In a specific implementation of the present invention, the at least two ToF sensors are arranged in a sensor array that includes at least one row and at least one column:

for each row of the sensor array, a geometric center of a target surface of each ToF sensor in the row is located on the same line, wherein a distance between any two adjacent ToF sensors in the row meets a preset first distance requirement, and an angle between target surfaces of any two adjacent ToF sensors in the row meets a preset angle requirement:

for each column of the sensor array, a geometric center of a target surface of each ToF sensor in the column is located on the same line, wherein a distance between any two adjacent ToF sensors in the column meets a preset second distance requirement, and target surfaces of any two adjacent ToF sensors in the column are coplanar or parallel to each other.

In a specific implementation of the present invention, target surfaces of any two adjacent ToF sensors in each row of the sensor array are coplanar or parallel to each other.

In a specific implementation of the present invention, the at least two adjacent ToF sensors are arranged on a preset sphere, and different ToF sensors are located at different locations on the preset sphere.

In a specific implementation of the present invention, the processor includes at least one Field Programmable Gate Array FPGA, and ToF controllers TFCs, each of which corresponds to a ToF sensor, wherein, the FPGA is configured to receive depth data input by each TFC, perform data fusion processing on all the received depth data to generate combined depth data, and obtain a combined depth map based on the combined depth data;

a first TFC of the TFCs contained in the processor is configured to generate a modulation signal and a demodulation signal, output the modulation signal to each light emitting element, and output the demodulation signal to each ToF sensor;

each TFC of the TFCs contained in the processor is configured to receive depth data input by a ToF sensor corresponding to the TFC, and output the received depth data to the FPGA.

In a specific implementation of the present invention, the method further includes: a color camera, the field of view of the color camera covers the composite field of view of the at least two ToF sensors:

the color camera is configured to collect color data and output the collected color data to the processor:

the processor is further configured to receive the color data input by the color camera and align the received color data with the combined depth data, so as to obtain a color image fused with depth information.

In a second aspect, the present application further provides a method for obtaining a combined depth map, applicable to a processor of a depth camera, the depth camera including the processor, at least one light emitting element and at least two ToF sensors, a composite irradiation range of the at least one light emitting element covering a composite field of view of the at least two ToF sensors, the method further including:

generating a modulation signal and a demodulation signal;

outputting the modulation signal to each light emitting element, and outputting the demodulation signal to each ToF sensor;

for each ToF sensor, receiving depth data that is obtained by the ToF sensor through demodulating, with the demodulation signal, a modulated light signal reflected back by an object within the field of view of the ToF sensor; wherein, the modulated light signal is transmitted by a light emitting element having an irradiation range corresponding to the field of view of the ToF sensor after the light emitting element modulates its own light signal with the modulation signal;

performing data fusion processing on all the received depth data to generate combined depth data; and obtaining a combined depth map based on the combined depth data.

In a specific implementation of the present invention, performing data fusion processing on all the received depth data to generate combined depth data includes:

determining each overlapping area of fields of view of the at least two ToF sensors;

for each pixel within each overlapping area of fields of view, determining, based on a confidence degree for the pixel of each of ToF sensors corresponding to the pixel, a depth value obtained by a ToF sensor with the highest confidence degree as the depth value of the pixel; and generating combined depth data based on the determined depth value of each pixel.

In a specific implementation of the present invention, performing data fusion processing on all the received depth data to generate combined depth data includes:

determining each overlapping area of fields of view of the at least two ToF sensors;

for each pixel within each overlapping area of fields of view, determining a depth value for the pixel based on a magnitude of a depth value for the pixel obtained by each ToF sensor corresponding to this pixel; and generating combined depth data based on the determined depth value of each pixel.

In a specific implementation of the present invention, the depth camera further includes a color camera, the field of view of the color camera covers the composite field of view of the at least two ToF sensors, the method further includes:

receiving color data input by the color camera; and aligning the received color data with the combined depth data to output color image fused with depth information.

The depth camera provided by the embodiments of the present application includes a processor, at least one light emitting element, and at least two ToF sensors, which can meet the application requirements of depth maps with a large field of view. In the depth camera, light emitting elements use the same modulation signal to modulate light signals and then transmit the modulated signals, and ToF sensors demodulate, with the same demodulation signal corresponding to the modulation signal, the received modulated light signals that are reflected back by objects to generate depth data. The problem of mutual interference due to asynchronization of modulation and demodulation can be avoided.

The processor performs data fusion processing on all the received depth data to obtain a combined depth map.

BRIEF DESCRIPTION OF THE DRAWINGS

To describe the technical solutions of embodiments of the present application and the prior art more clearly, the accompanying drawings used in the embodiments and the prior art are briefly described below. Obviously, the accompanying drawings described below are merely some embodiments of the present application, and those skilled in the art can obtain other drawings based on these drawings without creative efforts.

DETAILED DESCRIPTION

In order to enable those skilled in the art to better understand the technical solutions in the embodiments of the present application, the following clearly and completely describes the technical solutions in the embodiments of the present application with reference to the accompanying drawings in the embodiments of the present application. Obviously, the described embodiments are merely a part rather than all of the embodiments of the present application. All other embodiments obtained by those skilled in the art based on the embodiments of the present application without creative efforts fall within the protection scope of the present application.

Figure 1:
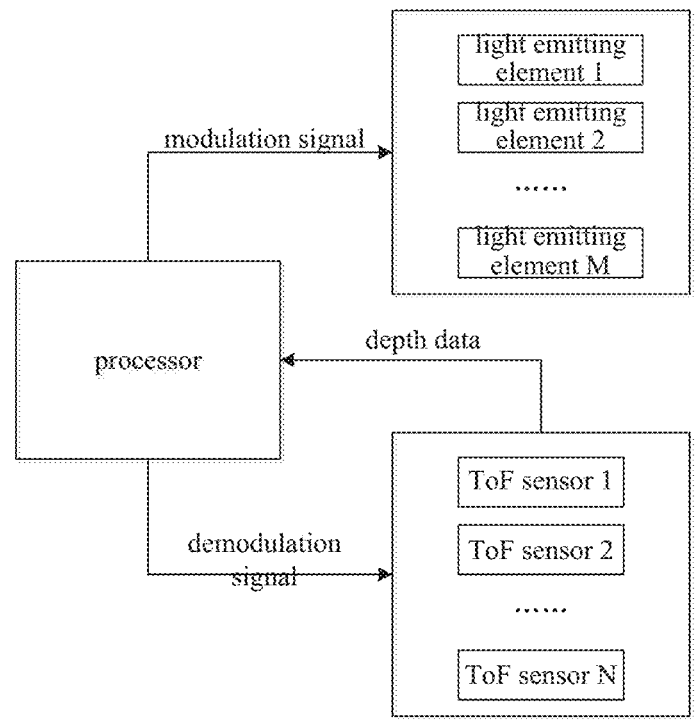
FIG. 1 is a schematic view illustrating a structure of a depth camera according to an embodiment of the present application.

Referring to FIG. 1, which is a schematic view illustrating a structure of a depth camera provided by an embodiment of the present application. The depth camera includes: a processor, at least one light emitting element, and at least two ToF (Time of flight) sensors. The composite irradiation range of the at least one light emitting element covers the composite field of view of the at least two ToF sensors, wherein, the processor is configured to generate a modulation signal and a demodulation signal, output the modulation signal to each light emitting element, and output the demodulation signal to each ToF sensor; receive depth data input by each ToF sensor; perform data fusion processing on all the received depth data to generate combined depth data; and obtain a combined depth map based on the combined depth data;

each light emitting element is configured to receive a modulation signal input by the processor, modulate its own light signal with the modulation signal, and transmit the modulated light signal to an object within its irradiation range;

each ToF sensor is configured to receive a demodulation signal input by the processor, receive a modulated light signal reflected back by an object within its field of view, demodulate the received light signal with the demodulation signal to generate depth data, and output the generated depth data to the processor.

The depth camera provided in the embodiment of the present application includes at least two ToF sensors, the spatial arrangement of the ToF sensors allows them to face different field of view areas respectively, and various field of view areas can be combined to form a larger field of view area. In practical applications, the number and arrangement of the ToF sensors and light emitting elements can be determined according to actual requirements on the field of view, as long as the composite irradiation range of all the light emitting elements of the depth camera can cover the composite field of view of all the ToF sensors.

The processor in the depth camera provided by the embodiment of the present application may obtain an external control signal through an input interface of the depth camera, the external control signal may be input by an operator to set and adjust corresponding parameters of the depth camera, for example, to set or adjust exposure time of the depth camera. The processor may generate, based on the external control signal, a modulation signal and a demodulation signal corresponding to the modulation signal.

The processor transmits the modulation signal to each light emitting element, and transmits the demodulation signal to each ToF sensor, i.e., all the light emitting elements in the depth camera use the same modulation signal and all the ToF sensors in the depth camera use the same demodulation signal to synchronize the modulation and demodulation.

After receiving the modulation signal transmitted by the processor, the light emitting element modulates its own light signal and transmits the modulated light signal. An object within the irradiation range of each light emitting element reflects back the modulated light signal of the light emitting element and the modulated light signal is received by a ToF sensor with the field of view range corresponding to the irradiation range.

The ToF sensor, after receiving the modulated light signal reflected back by an object within its field of view, demodulates the received modulated light signal with the demodulation signal to generate depth data. The depth data generated by each ToF sensor is depth value of each pixel obtained by the ToF sensor within its field of view. Each ToF sensor outputs the generated depth data to the processor.

After receiving depth data input by each ToF sensor, the processor may perform data fusion processing on all the received depth data, and select suitable original points for mapping the data within the composite field of view of the ToF sensors, in order to generate combined depth data and obtain a combined depth map based on the combined depth data. The processor may output the obtained combined depth map through an output interface of the depth camera as output of the depth camera.

In practical applications, the processor may also generate a control signal for each ToF sensor according to the received external control signal, and issue a corresponding parameter to the ToF sensor to perform corresponding control on the ToF sensor.

The depth camera provided by the embodiment of the present application includes a processor, at least one light emitting element, and at least two ToF sensors, which can meet the application requirements of a depth map of a large field of view. In the depth camera, light emitting elements use the same modulation signal to modulate the light signals and then transmit the modulated light signals, and ToF sensors demodulate the received modulated light signals reflected back by objects with the same demodulation signal corresponding to the modulation signal to generate depth data. The problem of mutual interference due to asynchronization of modulation and demodulation can be avoided. The processor performs data fusion processing on all the received depth data to obtain a combined depth map.

In one embodiment of the present application, the at least two ToF sensors may be arranged in a sensor array that includes at least one row and at least one column;

for each row of the sensor array, a geometric center of a target surface of each ToF sensor in the row is located on the same line, wherein a distance between any two adjacent ToF sensors in the row meets a preset first distance requirement, and an angle between target surfaces of any two adjacent ToF sensors in the row meets a preset angle requirement;

for each column of the sensor array, a geometric center of a target surface of each ToF sensor in the column is located on the same line, wherein a distance between any two adjacent ToF sensors in the column meets a preset second distance requirement, and target surfaces of any two adjacent ToF sensors in the column are coplanar or parallel to each other.

In practical applications, the spatial arrangement of the ToF sensors may be determined based on actual conditions. Several examples are provided in the following to illustrate the arrangement of the at least two ToF sensors contained in the depth camera.

EXAMPLE 1

Figure 2:
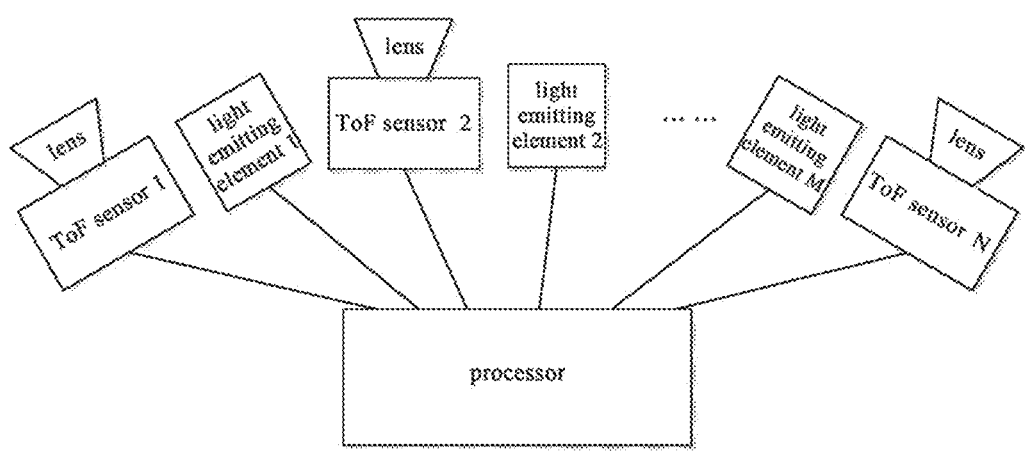
FIG. 2 is a schematic view illustrating an arrangement of ToF sensors according to an embodiment of the present application.

When a plurality of ToF sensors in the depth camera are arranged in a sensor array that only includes one row, the plurality of ToF sensors will be arranged in the same line, and geometric centers of target surfaces of all the ToF sensors are located on this line, the distance between any two adjacent ToF sensors meets a preset first distance requirement, and the angle between target surfaces of any two adjacent ToF sensors meets a preset angle requirement, as shown in FIG. 2.

EXAMPLE 2

Figure 3:
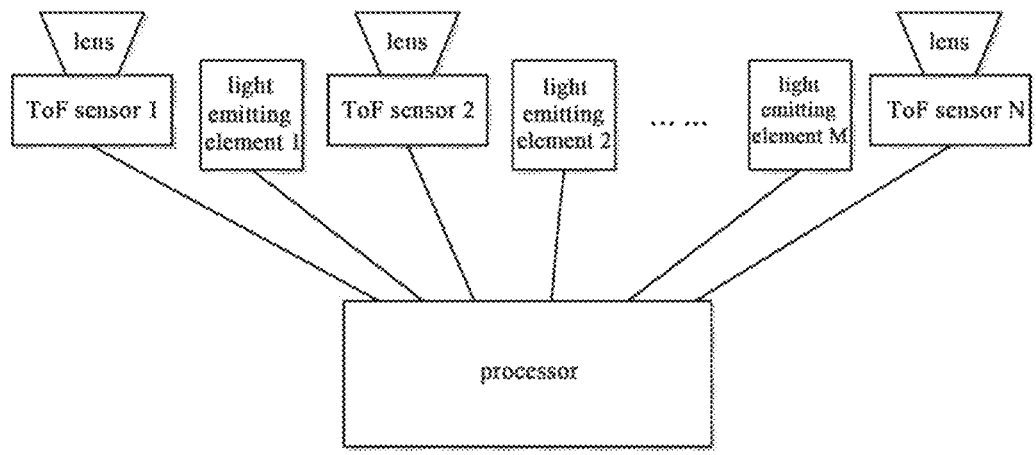
FIG. 3 is a schematic view illustrating another arrangement of ToF sensors according to an embodiment of the present application.

The angle between target surfaces of two adjacent ToF sensors in the above Example 1, may be 0, that is, the target surfaces of two adjacent ToF sensors are coplanar or parallel to each other, as shown in FIG. 3.

EXAMPLE 3

Figure 4:
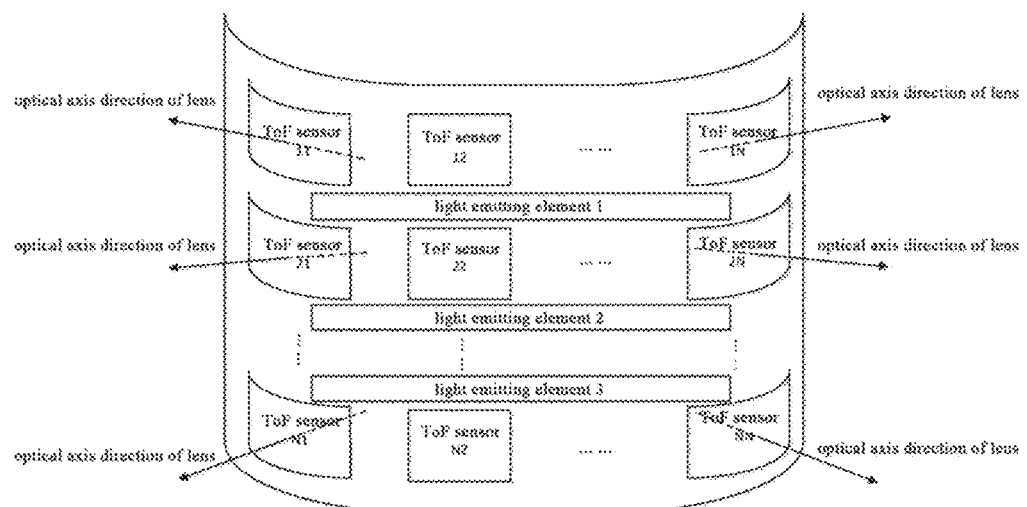
FIG. 4 is a schematic view illustrating another arrangement of ToF sensors according to an embodiment of the present application.

When a plurality of ToF sensors in the depth camera are arranged in a sensor array that includes multiple rows and multiple columns, the specific arrangement of ToF sensors in each row may be the same as that in Example 1 above. For each column in the sensor array, the geometric center of the target surface of each ToF sensor in the column is located on the same line, the distance between any two adjacent ToF sensors in the column meets a preset second distance requirement, and target surfaces of any two adjacent ToF sensors in the column are coplanar or parallel to each other, as shown in FIG. 4.

EXAMPLE 4

Figure 5:
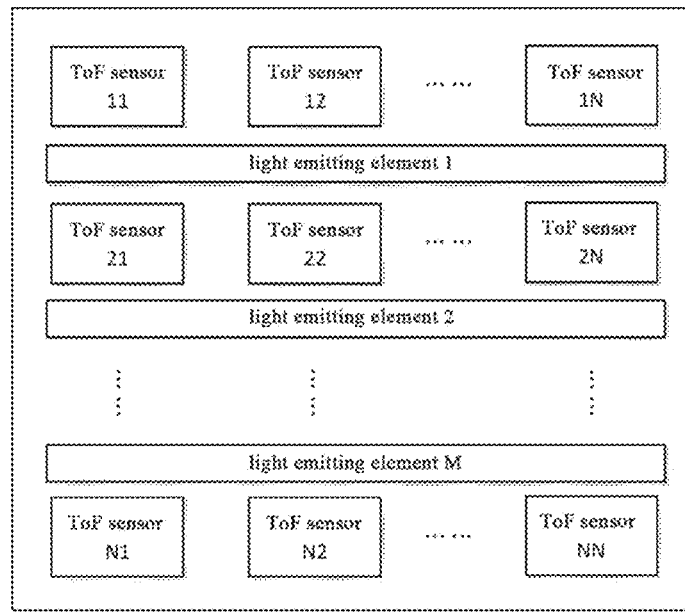
FIG. 5 is a schematic view illustrating another arrangement of ToF sensors according to an embodiment of the present application.

When a plurality of ToF sensors in the depth camera are arranged in a sensor array that includes multiple rows and multiple columns, the specific arrangement of ToF sensors in each row may be the same as that in Example 2 above, and the specific arrangement of ToF sensors in each column may be the same as that in Example 3 above, as shown in FIG. 5.

It should be noted that the preset first distance requirement, the preset second distance requirement, and the preset angle requirement can all be set and adjusted according to actual conditions, such as, according to the practical requirement of the field of view, which are not limited in the embodiments of the present application.

In one embodiment of the present application, the at least two ToF sensors are arranged on a preset sphere. Different ToF sensors are located at different locations on the preset sphere, as long as the practical requirement of the field of view can be satisfied.

It should be noted that, the ToF sensors may be mounted according to the arrangement of ToF sensors in the depth camera provided in the above embodiment of the present application by those skilled in the art. During the mounting of the ToF sensors, it is also necessary to mount light emitting elements according to the composite field of view of the ToF sensors, so that light emitted by the light emitting elements can cover the composite field of view of the ToF sensors. Of course, the specific arrangements of ToF sensors are not limited to those in the examples above. Those skilled in the art may derive other different examples according to the above-mentioned several examples, which will not be described in detail in the embodiments of the present application.

In practical applications, the processor in the depth camera may include a control chip so that a demodulation signal can be shared by a plurality of ToF sensors and a modulation signal can be shared by a plurality of light emitting elements. The control chip generates a modulation signal for the light emitting elements according to the principle of ToF technology and controls light emitted by the light emitting elements with the modulation signal. Simultaneously, the control chip generates a demodulation signal corresponding to the modulation signal according to the modulation signal and transmits the demodulation signal to all the ToF sensors to demodulate the modulated light signals.

The processor may collect depth data output by a plurality of ToF sensors using one chip, which may be the control chip for generating the modulation and demodulation signals as set forth above, or another separate chip. The chip may perform data fusion processing on the depth data collected from a plurality of ToF sensors to obtain a combined depth map, which is the output of the depth camera in the embodiments of the present application.

Figure 6:
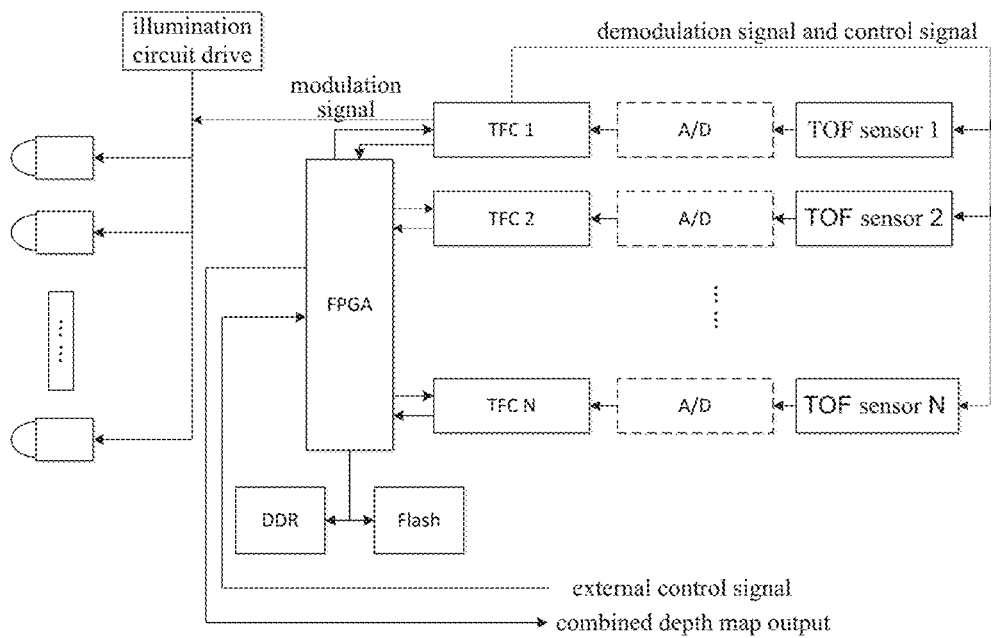
FIG. 6 is a schematic view illustrating another structure of a depth camera according to an embodiment of the present application.

As shown in FIG. 6, in one embodiment of the present application, the processor may include at least one FPGA (Field Programmable Gate Array), and ToF controllers TFCs, each of which corresponds to a ToF sensor, wherein, the FPGA is configured to receive depth data input by each TFC, perform data fusion processing on all the received depth data to generate combined depth data, and obtain a combined depth map based on the combined depth data:

a first TFC of the TFCs contained in the processor is configured to generate a modulation signal and a demodulation signal, output the modulation signal to each light emitting element, and output the demodulation signal to each ToF sensor:

each TFC of the TFCs contained in the processor receives depth data input by the corresponding ToF sensor, and output the received depth data to the FPGA.

TFC refers to a ToF controller, which is an ASIC chip configured to control a ToF system and process outputs of ToF sensors.

In an embodiment of the present application, the output of each ToF sensor contained in the depth camera will be analyzed by a corresponding TFC. According to the types of ToF sensors, the ToF sensor that output an analog signal needs to perform analog-digital conversion of the output and then send it to TFC. The demodulation signal for all the ToF sensors is generated by one of the TFCs so as to achieve demodulation synchronization, and the rest of the TFCs are only responsible for receiving depth data input by corresponding ToF sensors.

All the light emitting elements are driven by an illumination circuit of the depth camera to modulate light signals to be emitted with the modulation signal from the above-mentioned TFC generating the demodulation signal. In practical applications, each light emitting element may be composed of a plurality of LEDs, and may also be composed of a plurality of laser emitters and light learning light elements.

In an embodiment of the present application, the depth camera uses at least one FPGA to collect the depth data output by each TFC and perform data fusion processing on all the depth data to obtain a combined depth map, which may be used as an output of the entire depth camera for external use. At the same time, the FPGA may also receive external control signals and transmit the control signals to each TFC.

In an embodiment of the present application, the application of FPGA facilitates the collection and fusion computation of multiple signals. In practical applications, other processors satisfying the requirements of collection and computing capabilities may be used alternatively. It should be noted that, in FIG. 6, DDR is a dual data rate synchronous dynamic random access memory, which is called: Dual Data Rate SDRAM, and Flash is a flash memory. The locations of various components are only for convenience of illustration and do not represent the position in the actual structure.

Figure 7:
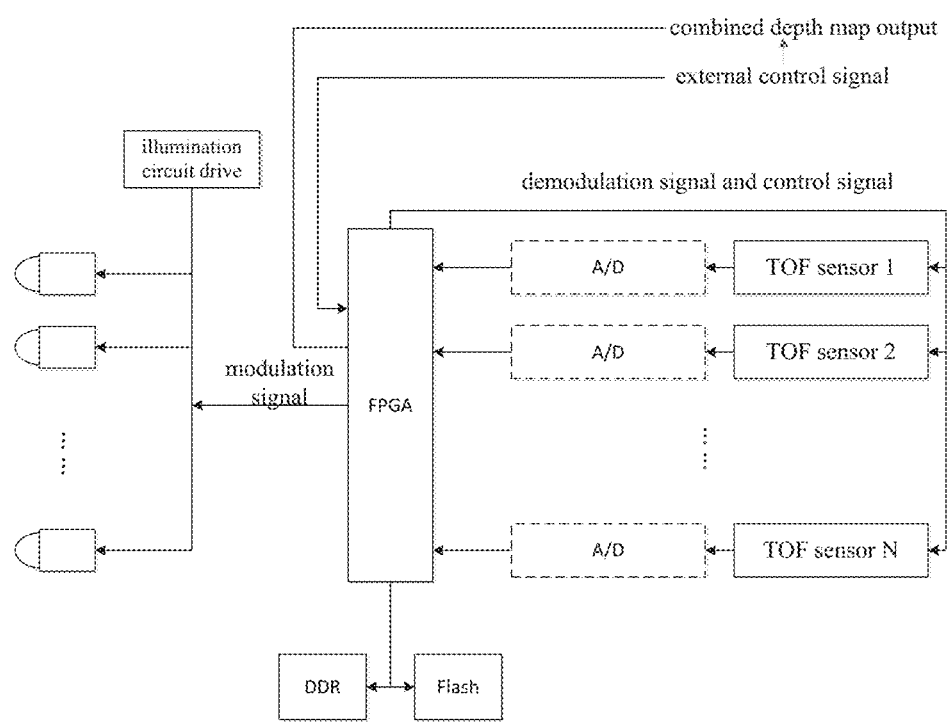
FIG. 7 is a schematic view illustrating another structure of a depth camera according to an embodiment of the present application.

In the above embodiment, depth data output by each ToF sensor is analyzed by one TFC. In another embodiment, the function of the TFC may be implemented by the FPGA in order to save hardware overhead of the TFC. As shown in FIG. 7, the collection, analysis, and processing etc. of depth data output by each ToF sensor, which are implemented by TFCs in the embodiment shown in FIG. 6, are all directly implemented by the FPGA. All of the modulation signal, demodulation signal and control signals are also generated by the FPGA. Of course, In practical applications, the FPGA in this embodiment may also be substituted by other processors satisfying the requirements of collection and computing resource capabilities.

In one embodiment of the present application, the depth camera may also include a color camera, the field of view of the color camera covers the composite field of view of the at least two ToF sensors:

the color camera is configured to collect color data and output the collected color data to the processor:

the processor is further configured to receive the color data input by the color camera and align the received color data with the combined depth data, so as to obtain a color image fused with depth information, i.e., an RGB-D image.

Color data can be collected with a color camera mounted in the depth camera. The processor may align the color data with the combined depth data, so as to obtain a color image fused with depth information, i.e., an RGB-D image, wherein, for each pixel, not only its own depth value but also its gray scale and color information are stored.

In correspondence with the embodiment of the depth camera set forth above, a method for obtaining a combined depth map is also provided in embodiments of the present application, applicable to a processor of a depth camera. The depth camera includes the processor, at least one light emitting element and at least two ToF sensors. The composite irradiation range of the at least one light emitting element covers the composite field of view of the at least two ToF sensors.

Figure 8:
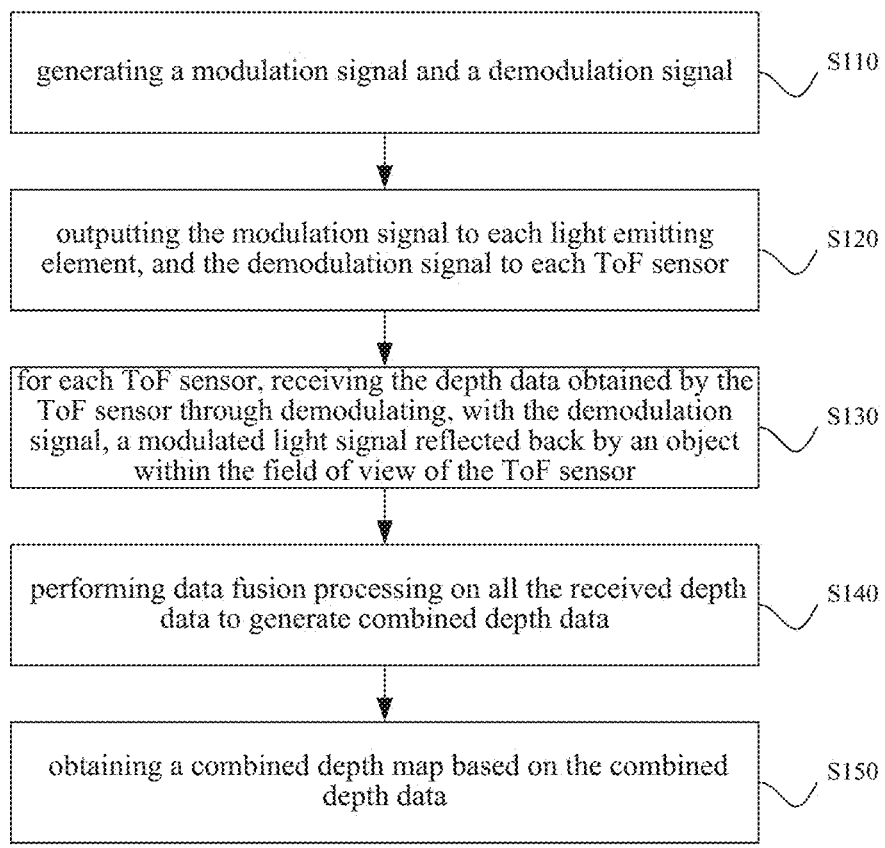
FIG. 8 is a flow chart for implementation of a method for obtaining a combined depth map according to an embodiment of the present application.

As shown in FIG. 8, the method may include the following steps:

S110, generating a modulation signal and a demodulation signal;

S120, outputting the modulation signal to each light emitting element, and outputting the demodulation signal to each ToF sensor;

S130, for each ToF sensor, receiving the depth data obtained by the ToF sensor through demodulating, with the demodulation signal, a modulated light signal reflected back by an object within the field of view of the ToF sensor;

wherein, the modulated light signal is transmitted by a light emitting element having an irradiation range corresponding to the field of view of the ToF sensor after the light emitting element modulates its own light signal with the modulation signal;

S140, performing data fusion processing on all the received depth data to generate combined depth data;

S150, obtaining a combined depth map based on the combined depth data.

For ease of illustration, the steps mentioned above are combined to explain.

The technical solution provided in the embodiment of the present application is applicable to a processor in a depth camera. The depth camera includes at least two ToF sensors, the spatial arrangement of the ToF sensors allows them to face different field of view areas respectively, and various field of view areas can be combined to form a larger field of view area. In practical applications, the number and arrangement of the ToF sensors and light emitting elements can be determined according to actual requirements on the field of view, as long as the composite irradiation range of all the light emitting elements of the depth camera can cover the composite field of view of all the ToF sensors.

The processor may generate a modulation signal and a demodulation signal corresponding to the modulation signal. The processor transmits the modulation signal to each light emitting element, and transmits the demodulation signal to each ToF sensor, that is, all the light emitting elements in the depth camera use the same modulation signal and all the ToF sensors in the depth camera use the same demodulation signal so that synchronization of modulation and demodulation can be achieved.

After receiving the modulation signal transmitted by the processor, the light emitting element modulates its own light signal and transmits the modulated light signal. An object within the irradiation range of each light emitting element reflects back the modulated light signal of the light emitting element and the modulated light signal is received by a ToF sensor with a field of view range corresponding to the irradiation range.

The ToF sensor, after receiving the modulated light signal reflected back by an object within its field of view, demodulates the received modulated light signal with the demodulation signal to generate depth data. The depth data generated by each ToF sensor is depth value of each pixel obtained by the ToF sensor within its field of view. Each ToF sensor outputs the generated depth data to the processor.

After receiving depth data input by each ToF sensor, the processor may perform data fusion processing on all the received depth data, and select suitable original points for mapping the data within the composite field of view of the ToF sensors, in order to generate combined depth data and obtain a combined depth map based on the combined depth data. The processor may output the obtained combined depth map through an output interface of the depth camera as output of the depth camera.

By applying the technical solutions provided in the embodiments of the present application, application requirements of a depth map of a large field of view can be satisfied. In the depth camera, light emitting elements use the same modulation signal to modulate light signals and then transmit the modulated light signals, and ToF sensors demodulate the received modulated light signals reflected back by objects with the same demodulation signal corresponding to the modulation signal to generate depth data. The problem of mutual interference due to asynchronization of modulation and demodulation can be avoided. The processor performs data fusion processing on all the received depth data to obtain a combined depth map.

In one specific embodiment of the present application, performing data fusion processing on all the received depth data to generate combined depth data in S140 may include:

Step 1, determining each overlapping area of fields of view of the at least two ToF sensors:

Step 2, for each pixel within each overlapping area of fields of view, determining, based on a confidence degree for the pixel of each of ToF sensors corresponding to the pixel, a depth value obtained by a ToF sensor with the highest confidence degree as the depth value of the pixel:

Step 3, generating combined depth data based on the determined depth value of each pixel.

For ease of illustration, the steps above are combined to explain.

There may be an error between the depth value output by a ToF sensor and the real value, confidence degree is typically used to indicate the magnitude of the error between the depth value and the real value. Generally, the higher the confidence degree is, the smaller the error is. There is a one-to-one correspondence between confidence degrees and depth values, that is, each pixel in depth data output by a ToF sensor has a corresponding depth value, as well as a confidence degree.

When there are overlaps in the fields of view of a plurality of ToF sensors contained in the depth camera, there are a plurality of depth values for each target pixel within the field of view overlapping area. The ToF sensor has a confidence degree corresponding to the depth value of each original pixel. For each target pixel within the field of view overlapping area, the depth value obtained by a ToF sensor corresponding to the highest confidence degree among confidence degrees of a plurality of original pixels corresponding to the target pixel is determined as the depth value of the pixel.

For example, the field of view of the ToF sensor A and the ToF sensor B has an overlapping area O. For each pixel in the overlapping area O, there are both the depth value obtained by the ToF sensor A and the depth value obtained by the ToF sensor B. For such a pixel, if the confidence degree corresponding to the depth value obtained by the ToF sensor A is higher than the confidence degree corresponding to the depth value obtained by the ToF sensor B, the depth value obtained by the ToF sensor A is determined as the depth value of the pixel.

There is a unique depth value for each pixel in an area other than the field of view overlapping area. Combined depth data can be generated based on the determined depth value for each pixel.

A specific calculation method is provided in embodiments of the present application for performing step S140, i.e., performing data fusion processing on all the received depth data to generate combined depth data.

A depth camera containing at least two ToF sensors is considered as a plurality of depth cameras, each of which contains a single ToF sensor. In this embodiment, all the description of depth camera is directed to a depth camera of a single ToF sensor. The preconditions for implementing this calculation method are as follows:

1. Depth cameras are mounted in such a manner that optical centers of all depth cameras are located on the same line, these depth cameras are real depth cameras, and Y-axes of the coordinate systems for the real depth cameras are parallel to each other 2. X-axis of the coordinate system for the virtual depth camera lies in a line connecting optical centers of the real depth cameras.

Figure 9:
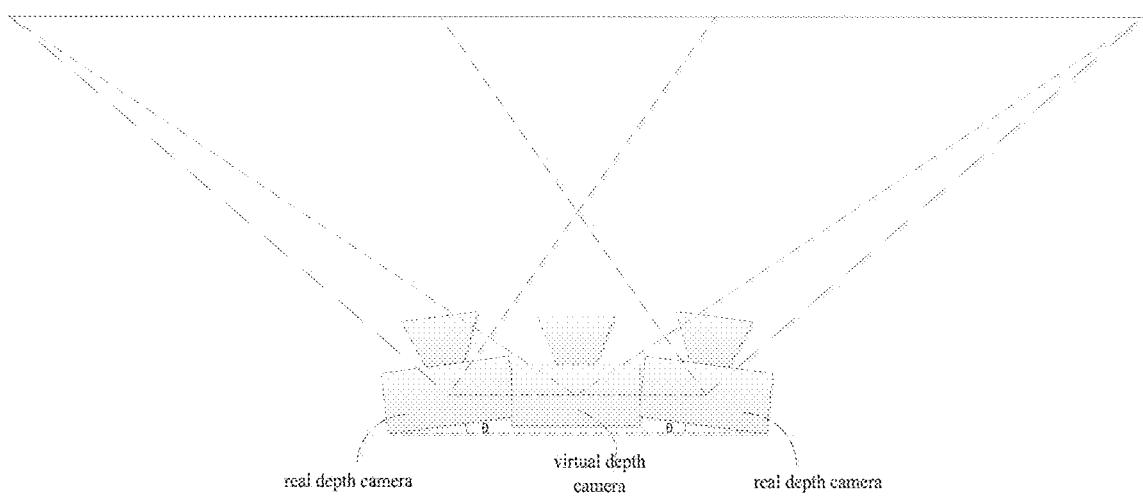
FIG. 9 is a schematic view illustrating the position of a real depth camera with respect to a virtual depth camera according to an embodiment of the present application.

Two real depth cameras meeting the above preconditions at separate positions are used in FIG. 9. A virtual depth camera is located at the midpoint of the line connecting optical centers of two real depth cameras. The focal length and field of view of the virtual depth camera may be defined according to actual requirements. Depth data of the two real depth cameras are respectively mapped onto the virtual depth camera for fusion. During the fusion, data beyond the field of view of the virtual depth camera are discarded and data within the field of view overlapping area is selected according to confidence degrees, wherein, if there are points in the two real depth cameras mapped to the same point in the virtual depth camera, the point with a larger confidence degree is retained. As shown in FIG. 9, there is an angle θ between the imaging plane of the real depth camera and the imaging plane of the virtual depth camera, and the value of θ may be zero, or it may be a positive or negative value. The angle θ between two real depth cameras can take different values, the specific values can be determined according to actual requirements. Correspondence between more than two real depth cameras and a virtual depth camera may be derived on the basis of FIG. 9, the detail of which will not be repeated herein.

Mapping relationship from the real depth cameras to the virtual depth camera is now derived in the following. During the derivation, the distortion of lens of cameras are not taken into account.

Figure 10:
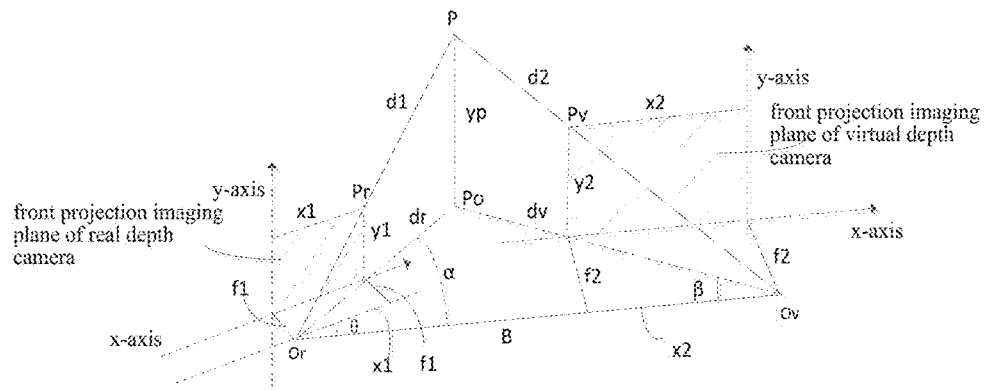
FIG. 10 is a schematic view illustrating the relationship between projection of a spatial point P in a real depth camera and projection of the same in a virtual depth camera according to an embodiment of the present application.

As shown in FIG. 10, Or is the optical center of a lens of a real depth camera, and Ov is the optical center of a lens of the virtual depth camera. The line connecting Or and Ov, labeled as B, is parallel to the imaging plane of the virtual depth camera. Cartesian coordinate systems are respectively established at Or and Ov according to a front projection model for camera imaging, wherein, X-axes of the two coordinate systems are coplanar with an angle θ there between, and Y-axes are parallel to each other. The focal length of the real depth camera is f1, and the focal length of the virtual depth camera is f2.

The projection point of a point P in space in the coordinate system for the real depth camera is Pr, its coordinates are (x1, y1) and the corresponding depth value is d1; the projection point of the point P in space in the coordinate system for the virtual depth camera is Pv, its coordinates are (x2, y2) and the corresponding depth value is d2. The point P has the same y coordinate, denoted as yp, in the two coordinate systems. The projection of point P on the plane where the X-axes of the two coordinate systems are located is Po. The line connecting Po and Or is denoted as dr, and the line connecting Po and Ov is denoted as dv. The angle between dr and B is denoted as α, and the angle between dv and B is denoted as β. Among the parameters listed above, B, θ, f1, f2 are constant during calculation.

According to trigonometric relationship:

$$\frac{\sqrt{x1^2 + y1^2 + f1^2}}{d1} = \frac{y1}{yp} = \frac{\sqrt{x1^2 + f1^2}}{dr}$$

and thus, $$yp = d1 * \frac{y1}{\sqrt{x1^2 + y1^2 + f1^2}}$$

$$dr = d1 * \frac{\sqrt{x1^2 + f1^2}}{\sqrt{x1^2 + y1^2 + f1^2}}$$

$$\alpha = \begin{cases} \theta + \arctan\left(\frac{f1}{x1}\right) & x1 > 0 \\ \theta + 90° & x1 = 0 \\ \theta + \arctan\left(\frac{f1}{x1}\right) + 180° & x1 < 0 \end{cases}$$

according to cosine law:

$$dv^2 = dr^2 + B^2 - 2 * B * dr * \cos\alpha$$

$$d2^2 = dv^2 + yp^2$$

and thus, $$d2 = \sqrt{d1^2 + B^2 - 2 * B * d1 * \frac{\sqrt{x1^2 + f1^2}}{\sqrt{x1^2 + y1^2 + f1^2}} * \cos\alpha}$$

let $k1 = 2 * \frac{\sqrt{x1^2 + f1^2}}{\sqrt{x1^2 + y1^2 + f1^2}} * \cos\alpha$, then $$d2 = \sqrt{d1^2 + B^2 - k1 * B * d1}$$

as can be seen, the value of k1 can be uniquely determined for a certain pixel (x1,y1). Further, according to trigonometric relationship:

$$\frac{\tan\alpha}{\tan\beta} = \frac{B - dr * \cos\alpha}{dr * \cos\alpha}$$

$$\tan\beta = \frac{dr * \sin\alpha}{B - dr * \cos\alpha}$$

$$x2 = -\frac{f2}{\tan\beta} = f2 * \left(\cot\alpha - \frac{B}{\sin\alpha} * \frac{\sqrt{x1^2 + y1^2 + f1^2}}{d1 * \sqrt{x1^2 + f1^2}}\right)$$

let $k2 = f2 * \cot\alpha$, $k3 = f2 * \frac{B}{\sin\alpha} * \frac{\sqrt{x1^2 + y1^2 + f1^2}}{\sqrt{x1^2 + f1^2}}$ then:

$$x2 = k2 - \frac{k3}{d1}$$

as can be seen, the values of k2 and k3 can be uniquely determined for a certain pixel (x1,y1).

Further, according to trigonometric relationship:

$$\frac{yp}{dr * \sin\alpha} = \frac{y2}{f2}$$

$$y2 = \frac{yp}{dr * \sin\alpha} * f2 = \frac{y1}{\sin\alpha * \sqrt{x1^2 + f1^2}} * f2$$

let $k4 = \frac{y1}{\sin\alpha * \sqrt{x1^2 + f1^2}} * f2$, it can be seen that the value of k4 can be uniquely determined for a certain pixel (x1,y1).

In summary, it can be summarized as follows: for a point (x1,y1) with a depth value d1 in the coordinate system for the real depth camera, the corresponding mapping point in the coordinate system for the virtual depth camera is (x2,y2), and its depth value is d2, there are the following relationships:

$$\begin{cases} d2 = \sqrt{d1^2 + B^2 - k1 * B * d1} \\ x2 = k2 - \frac{k3}{d1} \\ y2 = k4 \end{cases}$$

Wherein, for each fixed pixel (x1,y1), coefficients (k1,k2, k3,k4) can be uniquely determined as shown in the following formula:

$$\begin{cases} k1 = 2 * \frac{\sqrt{x1^2 + f1^2}}{\sqrt{x1^2 + y1^2 + f1^2}} * \cos\alpha \\ k2 = f2 * \cot\alpha \\ k3 = f2 * \frac{B}{\sin\alpha} * \frac{\sqrt{x1^2 + y1^2 + f1^2}}{\sqrt{x1^2 + f1^2}} \\ k4 = \frac{y1}{\sin\alpha * \sqrt{x1^2 + f1^2}} * f2 \\ \alpha = \begin{cases} \theta + \arctan\left(\frac{f1}{x1}\right) & x1 > 0 \\ \theta + 90° & x1 = 0 \\ \theta + \arctan\left(\frac{f1}{x1}\right) + 180° & x1 < 0 \end{cases} \end{cases}$$

Therefore, during the initialization of the depth camera, coefficients (k1, k2, k3, k4, a) for each point (x1,y1) in the coordinate system for each real depth camera can be calculated based on parameters of each real depth camera and virtual depth camera and stored in a table, such that during subsequent mapping calculation, the coefficients can be obtained by looking up in the table and substituted for calculation. Consumption of computing resource for calculating the coefficients may thus be eliminated. In addition, as $$-2 \leq k1 = 2 * \frac{\sqrt{x1^2 + f1^2}}{\sqrt{x1^2 + y1^2 + f1^2}} * \cos\alpha \leq 2,$$

we have $$d1 - B \leq d2 = \sqrt{d1^2 + B^2 - k1 * B * d1} \leq d1 + B$$

when B is sufficiently small, it can be considered that d2=d1, and the above mapping formula can be further simplified.

Figure 11:
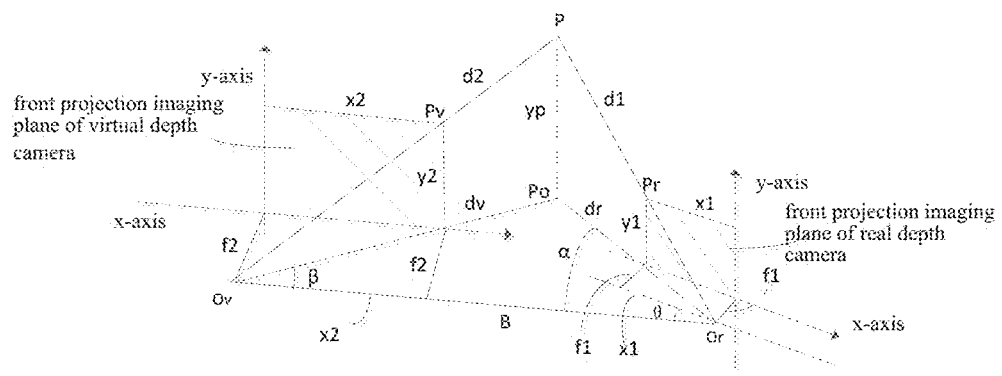
FIG. 11 is a schematic view illustrating another relationship between projection of a spatial point P in a real depth camera and projection of the same in a virtual depth camera according to an embodiment of the present application.

The derivation above is carried out based on the fact that Or is on the left of Ov. The following mapping functions can be similarly obtained when Or is on the right of Ov as shown in the structure illustrated in FIG. 11:

$$\begin{cases} d2 = \sqrt{d1^2 + B^2 - k1 * B * d1} \\ x2 = -k2 + \frac{k3}{d1} \\ y2 = k4 \end{cases}$$

mapping coefficients may be obtained as below:

$$\begin{cases} k1 = 2 * \frac{\sqrt{x1^2 + f1^2}}{\sqrt{x1^2 + y1^2 + f1^2}} * \cos\alpha \\ k2 = f2 * \cot\alpha \\ k3 = f2 * \frac{B}{\sin\alpha} * \frac{\sqrt{x1^2 + y1^2 + f1^2}}{\sqrt{x1^2 + f1^2}} \\ k4 = \frac{y1}{\sin\alpha * \sqrt{x1^2 + f1^2}} * f2 \\ \alpha = \begin{cases} \theta - \arctan\left(\frac{f1}{x1}\right) + 180° & x1 > 0 \\ \theta + 90° & x1 = 0 \\ \theta - \arctan\left(\frac{f1}{x1}\right) & x1 < 0 \end{cases} \end{cases}$$

Based on the above arrangement of multiple depth cameras and the mapping relationship from the real depth cameras to the virtual depth camera, the data fusion processing process for multiple depth data may be as follows:

During the initialization of the real depth camera, the position and focal length of the virtual depth camera are firstly determined, and then the distance and tilt angle of each real depth camera with respect to the virtual depth camera are calculated based on the parameters of the virtual depth camera. Subsequently, on the basis of these determined parameters, mapping coefficients (k1, k2, k3, k4, α) for each pixel of each real depth camera can be calculated according to the derivation process previously described and a look-up table can be generated. Finally, for each pixel within the depth data collected by each real depth camera, a mapping function coefficient is obtained by looking up in the table to calculate the position and depth value of the mapping target point, and a combined depth map is obtained.

During the process of mapping, a mapping target point will be discarded if the position of the point is beyond the field of view of the virtual depth camera. If there are multiple points that are mapped to the same target point at the same time, the depth value corresponding to the maximum confidence degree will be retained.

For a combined depth map with a large field of view, target recognition, tracking and other algorithms can be performed on it. For example, in an indoor environment, a person can be tracked and positioned using a combined depth map of a large field of view, or a combined depth map of a large field of view can be applied to a somatosensory game for recognition of a target motion in a game.

In another specific embodiment of the present application, performing data fusion processing on all the received depth data to generate combined depth data in S140 may include the following steps:

Step 1, determining each overlapping area of fields of view of the at least two ToF sensors;

Step 2, for each pixel within each overlapping area of fields of view, determining the depth value of this pixel based on the magnitude of the depth value for this pixel obtained by each ToF sensor corresponding to this pixel;

Step 3, generating combined depth data based on the determined depth value for each pixel.

For ease of illustration, the steps above are combined to explain.

When there are overlaps in the fields of view of a plurality of ToF sensors contained in the depth camera, there are a plurality of depth values for each target pixel within the field of view overlapping area. The depth value of the pixel can be determined based on these depth values.

For example, the field of view of the ToF sensor A and the ToF sensor B has an overlapping area O. For each pixel in the overlapping area O, there are both the depth value T1 obtained by the ToF sensor A and the depth value T2 obtained by the ToF sensor B. If T1>T2, the depth value T2 obtained by the ToF sensor B may be determined as the depth value of this pixel. It is also possible to take the average of T1 and T2 as the depth value of this pixel.

There is a unique depth value for each pixel in an area other than the field of view overlapping area. Combined depth data can be obtained based on the determined depth value for each pixel.

In one embodiment of the present application, the depth camera may further include a color camera, the field of view of the color camera covers the composite field of view of the at least two ToF sensors. The method may include the following steps:

Step 1, receiving color data input by the color camera; and

Step 2, aligning the received color data with the combined depth data to output an color image fused with depth information.

Color data can be collected with a color camera mounted in the depth camera. The processor may align the color data with the combined depth data, so as to obtain a color image fused with depth information, i.e., an RGB-D image, wherein, for each pixel, not only its own depth value but also its gray scale and color information are stored.

It should be noted that, relationship terms herein such as "first", "second" and the like are only used to distinguish one entity or operation from another entity or operation, and do not necessarily require or imply that there is any such actual relationship or order between those entities or operations. Moreover, the terms "include," "comprise" or any other variants are intended to cover a non-exclusive inclusion, such that processes, methods, objects or devices comprising a series of elements include not only those elements, but also other elements not specified or the elements inherent to those processes, methods, objects or devices. Without further limitations, elements limited by the phrase "comprise(s) a . . . " do not exclude that there are other identical elements in the processes, methods, objects or devices that comprise that element.

The various embodiments in the specification are described in an interrelated way, and the same or similar parts among the embodiments may refer to each other. Each embodiment focuses on the difference from other embodiments. In particular, for device embodiments, as they are basically similar to the method embodiments, their description is relatively simple, and one need only refer to relevant parts of the description of the method embodiments.

It will be understood by one of ordinary skills in the art that all or part of the steps in the embodiments which implement the method described above can be implemented by instructing the related hardware with programs, which can be stored in a computer readable storage medium such as ROM/RAM, a magnetic disk, an optical disk.

The description above is merely preferred embodiments of the present application, and is not used to limit the protection scope of the present application. Any modification, equivalent replacement or improvement made within the spirit and principle of the present application falls within the protection scope of the present application.

What is claimed is:

1. A depth camera, comprising: a processor, at least one light emitting element, and at least two ToF sensors; a composite irradiation range of the at least one light emitting element covering a composite field of view of the at least two ToF sensors, wherein, the processor is configured to generate a modulation signal and a demodulation signal, and output the modulation signal to each light emitting element, output the demodulation signal to each ToF sensor, and receive depth data input by each ToF sensor, perform data fusion processing on all the received depth data to generate combined depth data, and obtain a combined depth map based on the combined depth data;

each light emitting element is configured to receive a modulation signal input by the processor, modulate its own light signal with the modulation signal, and transmit a modulated light signal to an object within its own irradiation range;

each ToF sensor is configured to receive a demodulation signal input by the processor, receive a modulated light signal reflected back by an object within its own field of view, demodulate the received light signal with the demodulation signal to generate depth data, and output the generated depth data to the processor;

wherein all light emitting elements use the same modulation signal to modulate light signals, and all ToF sensors use the same demodulation signal corresponding to the modulation signal to demodulate modulated light signals; and wherein, the processor comprises at least one Field Programmable Gate Array FPGA, and ToF controllers (TFCs), each of which corresponds to a ToF sensor, wherein, the FPGA is configured to receive depth data input by each TFC, perform data fusion processing on all the received depth data to generate combined depth data, and obtain a combined depth map based on the combined depth data;

a first TFC of the TFCs contained in the processor is configured to generate a modulation signal and a demodulation signal, and output the modulation signal to each light emitting element, and output the demodulation signal to each ToF sensor;

each TFC of the TFCs contained in the processor is configured to receive depth data input by a ToF sensor corresponding to the TFC, and output the received depth data to the FPGA.

2. The depth camera of claim 1, wherein, the at least two ToF sensors are arranged in a sensor array that comprises at least one row and at least one column;

for each row of the sensor array, a geometric center of a target surface of each ToF sensor in the row is located on the same line, wherein a distance between any two adjacent ToF sensors in the row meets a preset first distance requirement, and an angle between target surfaces of any two adjacent ToF sensors in the row meets a preset angle requirement;

for each column of the sensor array, a geometric center of a target surface of each ToF sensor in the column is located on the same line, wherein a distance between any two adjacent ToF sensors in the column meets a preset second distance requirement, and target surfaces of any two adjacent ToF sensors in the column are coplanar or parallel to each other.

3. The depth camera of claim 2, wherein, target surfaces of any two adjacent ToF sensors in each row of the sensor array are coplanar or parallel to each other.

4. The depth camera of claim 3, further comprising: a color camera, the field of view of the color camera covers the composite field of view of the at least two ToF sensors:

the color camera is configured to collect color data and output the collected color data to the processor;

the processor is further configured to receive color data input by the color camera and align the received color data with the combined depth data to obtain a color image fused with depth information.

5. The depth camera of claim 2, further comprising: a color camera, the field of view of the color camera covers the composite field of view of the at least two ToF sensors:

the color camera is configured to collect color data and output the collected color data to the processor;

the processor is further configured to receive color data input by the color camera and align the received color data with the combined depth data to obtain a color image fused with depth information.

6. The depth camera of claim 1, wherein, the at least two ToF sensors are arranged on a preset sphere, and different ToF sensors are located at different locations on the preset sphere.

7. The depth camera of claim 6, further comprising: a color camera, the field of view of the color camera covers the composite field of view of the at least two ToF sensors:

the color camera is configured to collect color data and output the collected color data to the processor;

the processor is further configured to receive color data input by the color camera and align the received color data with the combined depth data to obtain a color image fused with depth information.

8. The depth camera of claim 1, further comprising: a color camera, the field of view of the color camera covers the composite field of view of the at least two ToF sensors:

the color camera is configured to collect color data and output the collected color data to the processor;

the processor is further configured to receive color data input by the color camera and align the received color data with the combined depth data to obtain a color image fused with depth information.

9. The depth camera of claim 1, further comprising: a color camera, the field of view of the color camera covers the composite field of view of the at least two ToF sensors:

the color camera is configured to collect color data and output the collected color data to the processor;

the processor is further configured to receive color data input by the color camera and align the received color data with the combined depth data to obtain a color image fused with depth information.

10. A method for obtaining a combined depth map, applicable to a processor of a depth camera, the depth camera comprising the processor, at least one light emitting element and at least two ToF sensors, a composite irradiation range of the at least one light emitting element covering a composite field of view of the at least two ToF sensors, wherein, the processor comprises at least one Field Programmable Gate Array FPGA, and ToF controllers TFCs, each of which corresponds to a ToF sensor, wherein, the FPGA is configured to receive depth data input by each TFC, perform data fusion processing on all the received depth data to generate combined depth data, and obtain a combined depth map based on the combined depth data;

a first TFC of the TFCs contained in the processor is configured to generate a modulation signal and a demodulation signal, and output the modulation signal to each light emitting element, and output the demodulation signal to each ToF sensor;

each TFC of the TFCs contained in the processor is configured to receive depth data input by a ToF sensor corresponding to the TFC, and output the received depth data to the FPGA;

the method comprising:

generating a modulation signal and a demodulation signal;

outputting the modulation signal to each light emitting element, and outputting the demodulation signal to each ToF sensor;

for each ToF sensor, receiving depth data that is obtained by the ToF sensor through demodulating, with the demodulation signal, a modulated light signal reflected back by an object within the field of view of the ToF sensor; wherein, the modulated light signal is transmitted by a light emitting element having an irradiation range corresponding to the field of view of the ToF sensor after the light emitting element modulates its own light signal with the modulation signal;

performing data fusion processing on all the received depth data to generate combined depth data; and obtaining a combined depth map based on the combined depth data.

11. The method of claim 10, wherein, performing data fusion processing on all the received depth data to generate combined depth data comprises:

determining each overlapping area of fields of view of the at least two ToF sensors;

for each pixel within each overlapping area of fields of view, determining, based on a confidence degree for the pixel of each of ToF sensors corresponding to the pixel, a depth value obtained by a ToF sensor with the highest confidence degree as the depth value of the pixel; and generating combined depth data based on the determined depth value of each pixel.

12. The method of claim 11, wherein, the depth camera further comprises a color camera, the field of view of the depth camera covers the composite field of view of the at least two ToF sensors, the method further comprises:
  receiving color data input by the color camera; and
  aligning the received color data with the combined depth data to output a color image fused with depth information.

13. The method of claim 10, wherein, performing data fusion processing on all the received depth data to generate combined depth data comprises:
  determining each overlapping area of fields of view of the at least two ToF sensors;
  for each pixel within each overlapping area of fields of view, determining a depth value for the pixel based on a magnitude of a depth value for the pixel obtained by each ToF sensor corresponding to the pixel; and
  generating combined depth data based on the determined depth value of each pixel.

14. The method of claim 13, wherein, the depth camera further comprises a color camera, the field of view of the depth camera covers the composite field of view of the at least two ToF sensors, the method further comprises:
  receiving color data input by the color camera; and
  aligning the received color data with the combined depth data to output a color image fused with depth information.

15. The method of claim 10, wherein, the depth camera further comprises a color camera, the field of view of the depth camera covers the composite field of view of the at least two ToF sensors, the method further comprises:
  receiving color data input by the color camera; and
  aligning the received color data with the combined depth data to output a color image fused with depth information.

* * * * *